United States Patent
Yang et al.

(10) Patent No.: US 11,765,625 B2
(45) Date of Patent: *Sep. 19, 2023

(54) INFORMATION TRANSMISSION METHOD, NETWORK APPARATUS, AND TERMINAL APPARATUS

(71) Applicant: GUANGDONG OPPO MOBILE TELECOMMUNICATIONS CORP., LTD., Guangdong (CN)

(72) Inventors: Ning Yang, Guangdong (CN); Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 12 days.

This patent is subject to a terminal disclaimer.

(21) Appl. No.: 17/389,509

(22) Filed: Jul. 30, 2021

(65) Prior Publication Data

US 2021/0360487 A1 Nov. 18, 2021

Related U.S. Application Data

(63) Continuation of application No. 16/463,604, filed as application No. PCT/CN2016/110143 on Dec. 15, 2016, now Pat. No. 11,102,681.

(51) Int. Cl.
*H04W 28/26* (2009.01)
*H04W 76/27* (2018.01)
(Continued)

(52) U.S. Cl.
CPC ........... *H04W 28/26* (2013.01); *H04W 72/23* (2023.01); *H04W 76/27* (2018.02); *H04W 80/02* (2013.01)

(58) Field of Classification Search
None
See application file for complete search history.

(56) References Cited

U.S. PATENT DOCUMENTS 9,553,701 B2* 1/2017 Sadeghi ............... H04W 72/23
10,306,624 B2* 5/2019 Shu .................... H04W 52/0212
(Continued)

FOREIGN PATENT DOCUMENTS

CN 101867876 A 10/2010
CN 101925077 A 12/2010
(Continued)

OTHER PUBLICATIONS

International Search Report in the international application No. PCT/CN2016/110143, dated Sep. 11, 2017.
(Continued)

*Primary Examiner* — Faiyazkhan Ghafoerkhan

(57) ABSTRACT

Provided in embodiments of the present application are an information transmission method, network apparatus, and terminal apparatus, enabling flexible distribution of reserved resources, and accordingly improving efficiency of using the reserved resources. The method comprises: a network apparatus sending second instruction information used to configure first instruction information; and the network apparatus sending, according to the configuration of the first instruction information, the first instruction information used to instruct resource reservation.

20 Claims, 4 Drawing Sheets

(51) Int. Cl.
*H04W 80/02* (2009.01)
*H04W 72/23* (2023.01)

(56) References Cited

U.S. PATENT DOCUMENTS

| | | | |
|---|---|---|---|
| 10,869,272 B2* | 12/2020 | Shu | H04W 72/21 |
| 11,102,681 B2* | 8/2021 | Yang | H04W 72/23 |
| 2009/0262699 A1 | 10/2009 | Wengerter | |
| 2011/0310821 A1 | 12/2011 | Kim | |
| 2014/0003314 A1* | 1/2014 | Shu | H04W 52/0212 |
| | | | 370/336 |
| 2014/0086173 A1* | 3/2014 | Sadeghi | H04W 68/02 |
| | | | 370/328 |
| 2014/0092832 A1 | 4/2014 | Han | |
| 2014/0148177 A1* | 5/2014 | Ratasuk | H04W 72/04 |
| | | | 455/450 |
| 2015/0103725 A1 | 4/2015 | Sun et al. | |
| 2015/0334637 A1 | 11/2015 | Kim et al. | |
| 2017/0026943 A1* | 1/2017 | Kim | H04W 72/27 |
| 2017/0111884 A1* | 4/2017 | Sadeghi | H04L 27/2649 |
| 2017/0231011 A1* | 8/2017 | Park | H04W 72/0446 |
| 2017/0325049 A1* | 11/2017 | Basu Mallick | H04W 48/12 |
| 2017/0332358 A1* | 11/2017 | Park | H04L 1/1671 |
| 2017/0346534 A1* | 11/2017 | Islam | H01Q 1/246 |
| 2017/0346535 A1* | 11/2017 | Islam | H04B 7/0426 |
| 2017/0346539 A1* | 11/2017 | Islam | H04B 7/0408 |
| 2017/0346543 A1* | 11/2017 | Islam | H04B 7/0417 |
| 2017/0346544 A1* | 11/2017 | Islam | H04B 7/0695 |
| 2017/0346545 A1* | 11/2017 | Islam | H04B 7/0628 |
| 2018/0097673 A1* | 4/2018 | Nangia | H04L 5/0087 |
| 2018/0234888 A1* | 8/2018 | Yasukawa | H04W 4/40 |
| 2018/0376422 A1* | 12/2018 | Shu | H04W 52/0235 |
| 2020/0187056 A1* | 6/2020 | Yang | H04W 76/27 |
| 2021/0360487 A1* | 11/2021 | Yang | H04W 80/02 |

FOREIGN PATENT DOCUMENTS

| | | |
|---|---|---|
| CN | 101998553 A | 3/2011 |
| CN | 102056330 A | 5/2011 |
| CN | 105519195 A | 4/2016 |
| CN | 105874832 A | 8/2016 |
| JP | 2019536375 A | 12/2019 |
| JP | 2020503738 | 1/2020 |
| RU | 2335852 C2 | 10/2008 |
| RU | 2593385 C1 | 8/2016 |
| WO | 2013166692 A1 | 11/2013 |
| WO | 2015054643 A1 | 4/2015 |
| WO | 2015117499 A1 | 8/2015 |
| WO | 2016021963 A1 | 2/2016 |
| WO | 2018097680 A1 | 5/2018 |

OTHER PUBLICATIONS

Written Opinion of the International Search Authority in the international application No. PCT/CN2016/110143, dated Sep. 11, 2017.
Supplementary European Search Report in the European application No. 16924110.6, dated Oct. 1, 2019.
Intel Corporation: "Remaining details of signaling support for reserved resources", 3GPP Draft; R1-1612001 Intel NR FWD Compatibility, 3rd Generation Partnership Project (3GPP), vol. RAN WG1, No. Reno, USA; Nov. 14-Nov. 18, 2016 Nov. 13, 2016 (Nov. 13, 2016), XP051175965, sections 1 and 2, 4 pages.
Huawei Hisilicon: "Signalling design for reserved resource indication", 3GPP Draft; R1-1611206, 3rd Generation Partnership Project (3GPP), vol. RAN WG1, No. Reno, USA; Nov. 14-Nov. 18, 2016 Nov. 13, 2016 (Nov. 13, 2016), XP051175187, sections 1 and 3, 3 pages.
Samsung: "Indication of Reserved Resources", 3GPP Draft; R1-1612440 Reserved Resource_Final, 3rd Generation Partnership Project (3GPP), vol. RAN WG1, No. Reno, USA; Nov. 14-Nov. 18, 2016 Nov. 13, 2016 (Nov. 13, 2016), XP051176388, the whole document, 3 pages.
Nokia Alcatel-Lucent Shanghai Bell: "On the signalling support for forward compatibility", 3GPP Draft; R1-1612265_FWRDC, 3rd Generation Partnership Project (3GPP), vol. RAN WG1, No. Reno, USA; Nov. 14-Nov. 18, 2016 Nov. 13, 2016 (Nov. 13, 2016), XP051176214, the whole document, 5 pages.
First Office Action of the European application No. 16924110.6, dated Jul. 21, 2020.
European Search Report in the European application No. 21175658.0, dated Jul. 14, 2021.
First Office Action of the Japanese application No. 2019-530152, dated Nov. 27, 2020.
ZTE; "Details of Design on DL frame structure and signaling for LAA", 3GPP TSG RAN WG1 Meeting #83 R1-156988, Anaheim, USA, Nov. 15-22, 2015, 11 pages.
Notice of Allowance of the Japanese application No. 2019-530152, dated Mar. 30, 2021.
Office Action of the Indian application No. 201917021581, dated Jan. 27, 2021.
First Office Action of the Russian application No. 2019122257, dated Mar. 20, 2020.
Written Opinion of the Singaporean application No. 11201905076S, dated Jun. 16, 2020.
First Office Action of the Indonesian application No. P00201905968, dated Jun. 15, 2021.
First Office Action of the Canadian application No. 3046004, dated Jun. 11, 2020.
Second Office Action of the Canadian application No. 3046004, dated Apr. 14, 2021.
First Office Action of the Chilean application No. 201901647, dated Feb. 18, 2020.
Second Office Action of the Chilean application No. 201901647, dated Jun. 18, 2020.
First Office Action of the Brazilian application No. BR1120190120785, dated Sep. 9, 2020.
First Office Action of the Israel application No. 267058, dated Dec. 22, 2020.
First Office Action of the Chinese application No. 201680091467.9, dated Apr. 24, 2020.
Second Office Action of the Chinese application No. 201680091467.9, dated Jul. 15, 2020.
Notice of Rejection of the Chinese application No. 201680091467.9, dated Oct. 22, 2020.
Office Action of the Taiwanese application No. 106142301, dated Apr. 23, 2021.
First Office Action of the U.S. Appl. No. 16/463,604, dated Oct. 6, 2020.
Notice of Allowance of the U.S. Appl. No. 16/463,604, dated Apr. 20, 2021.
Corrected Notice of Allowance of the U.S. Appl. No. 16/463,604, dated Jul. 28, 2021.
First Office Action of the Japanese application No. 2021-076126, dated Jun. 3, 2022.
First Office Action of the Mexican application No. MX/a/2019/007082, dated Jun. 15, 2022.
Authorization Patent of the Taiwanese application No. 106142301, dated Nov. 1, 2021.
Office Action of the Australian application No. 2016432636, dated Sep. 13, 2021.
First Office Action of the Malaysian application No. PI2019003161, dated Mar. 8, 2023.

* cited by examiner

INFORMATION TRANSMISSION METHOD, NETWORK APPARATUS, AND TERMINAL APPARATUS

CROSS-REFERENCE TO RELATED APPLICATIONS

This application is a continuation application of U.S. application Ser. No. 16/463,604, field on May 23, 2019, which is a national stage application of International Patent Application No. PCT/CN2016/110143 filed on Dec. 15, 2016. The contents of both applications are incorporated by reference herein in their entity.

TECHNICAL FIELD

The disclosure relates to the field of communications, and more particularly to a method for transmitting information, a network device and a terminal device.

BACKGROUND

In a Long Term Evolution (LTE) system, a subframe may be reserved for a specific service, and multiple cells may send data on the subframe. Therefore, the subframe is required to be reserved in advance. Herein, the subframe is reserved through Radio Resource Control (RRC) signaling.

In a New Radio (NR) design, there is a relatively high requirement made to resource utilization efficiency. For resource reservation, how to flexibly reserve a resource to improve utilization efficiency of the reserved resource is a problem urgent to be solved.

SUMMARY

Embodiments of the disclosure provide a method for transmitting information, a network device and a terminal device, which may implement flexible allocation of a reserved resource, thereby improving efficiency of the reserved resource.

In a first aspect, there is provided a method for transmitting information, which may include the following operation.

A network device sends first indication information, here, the first indication information is used to indicate a reserved resource and is sent according to a configuration of the first indication information.

Optionally, before the operation that the network device sends the first indication information, the method may further include the following operation.

The network device sends second indication information, here, the second indication information is used to configure the first indication information.

Optionally, the first indication information may be used to modify a previous reserved resource that has been configured.

Optionally, the second indication information may be used to indicate at least one of: a period for sending the first indication information, a sending pattern of the first indication information, or a resource occupied by the first indication information.

Optionally, the first indication information may be used to indicate at least one piece of information of: a period of the reserved resource, a size of the reserved resource, a pattern of the reserved resource, a time domain resource occupied by the reserved resource, a frequency domain resource occupied by the reserved resource, a code domain resource occupied by the reserved resource, or a space domain resource occupied by the reserved resource.

Optionally, different information may be carried in different fields in the first indication information.

Optionally, the first indication information may carry an uplink or downlink grant that is able to index a service for which the reserved resource is used.

Optionally, the uplink or downlink grant may include an index of the service or a logical channel identifier of the service.

Optionally, the first indication information may be carried through a system message or a dedicated message.

Optionally, the second indication information may be carried through a system message or a dedicated message.

Optionally, the dedicated message may be Radio Resource Control (RRC) layer dedicated signaling, Media Access Control (MAC) layer control signaling, or physical layer control signaling.

In a second aspect, there is provided a method for transmitting information, which may include the following operation.

A terminal device receives first indication information, here, the first indication information is used to indicate a reserved resource and is received according to a configuration of the first indication information.

Optionally, before the operation that the terminal device receives the first indication information, the method may further include the following operation.

The terminal device receives second indication information, here, the second indication information is used to configure the first indication information.

Optionally, the first indication information may be used to modify a previous reserved resource that has been configured.

Optionally, the method may further include the following operation.

Data is received or sent on the reserved resource.

Optionally, the first indication information may carry an uplink or downlink grant that is able to index a service for which the reserved resource is used.

The operation that the data is received or sent on the reserved resource may include the following operation.

Data in the service is received or sent on the reserved resource.

Optionally, the uplink or downlink grant may include an index of the service or a logical channel identifier of the service.

Optionally, the second indication information may be used to indicate at least one of: a period for sending the first indication information, a sending pattern of the first indication information, or a resource occupied by the first indication information.

Optionally, the first indication information may be used to indicate at least one piece of information of: a period of the reserved resource, a size of the reserved resource, a pattern of the reserved resource, a time domain resource occupied by the reserved resource, a frequency domain resource occupied by the reserved resource, a code domain resource occupied by the reserved resource, or a space domain resource occupied by the reserved resource.

Optionally, different information may be carried in different fields in the first indication information.

Optionally, the first indication information may be carried through a system message or a dedicated message.

Optionally, the second indication information may be carried through a system message or a dedicated message.

Optionally, the dedicated message may be RRC layer dedicated signaling, MAC layer control signaling or physical layer control signaling.

In a third aspect, there is provided a network device, which may include units executing the method in the first aspect or any optional implementation mode thereof.

In a fourth aspect, there is provided a terminal device, which may include units executing the method in the second aspect or any optional implementation mode thereof.

In a fifth aspect, there is provided a network device, which may include a memory and a processor. The memory stores an instruction, and the processor is configured to call the instruction stored in the memory to execute the method in the first aspect or any optional implementation mode thereof.

In a sixth aspect, there is provided a terminal device, which may include a memory and a processor. The memory stores an instruction, and the processor is configured to call the instruction stored in the memory to execute the method in the second aspect or any optional implementation mode thereof.

In a seventh aspect, there is provided a computer-readable medium, which stores a program code configured to be executed by a terminal device, the program code includes an instruction configured to execute the method in the first aspect or each implementation mode thereof.

In an eighth aspect, there is provided a computer-readable medium, which stores a program code configured to be executed by a terminal device, the program code includes an instruction configured to execute the method in the second aspect or each implementation mode thereof.

In a ninth aspect, there is provided a system chip, which includes an input interface, an output interface, a processor and a memory. The processor is configured to execute a code in the memory. When the code is executed, the processor may implement the method in the first aspect and each implementation mode.

In a tenth aspect, there is provided a system chip, which includes an input interface, an output interface, a processor and a memory. The processor is configured to execute a code in the memory. When the code is executed, the processor may implement the method in the second aspect and each implementation mode.

In the embodiments of the disclosure, the network device, according to the configuration information of the first indication information, sends to the terminal device the first indication information used to indicate configuration information of the reserved resource allocated for the terminal device, and then the terminal device may acquire the configuration information of the reserved resource according to configuration information of the first indication information. Therefore, the reserved resource may be flexibly allocated, and efficiency of the reserved resource may be improved.

BRIEF DESCRIPTION OF DRAWINGS

In order to describe the technical solutions of the embodiments of the disclosure more clearly, the drawings required to be used in descriptions about the embodiments or a related art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
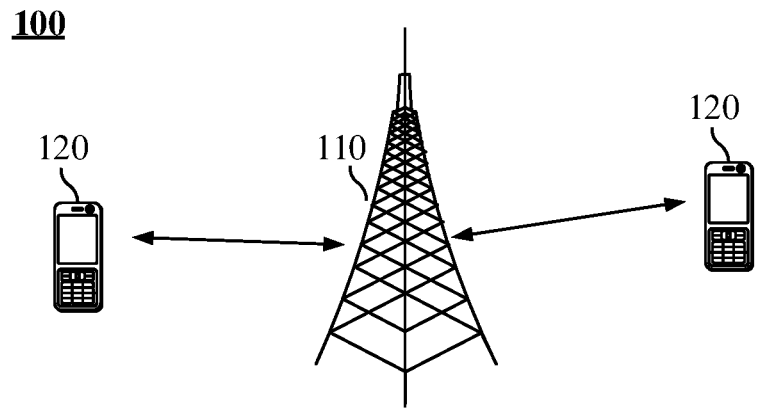
FIG. 1 is a schematic diagram of a wireless communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Optionally, the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal devices 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the 5G system or network may also be called an NR system or network.

A network device and two terminal devices are exemplarily illustrated in FIG. 1. Optionally, the wireless communication system 100 may include multiple network devices and another number of terminal devices may be in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

Figure 2:
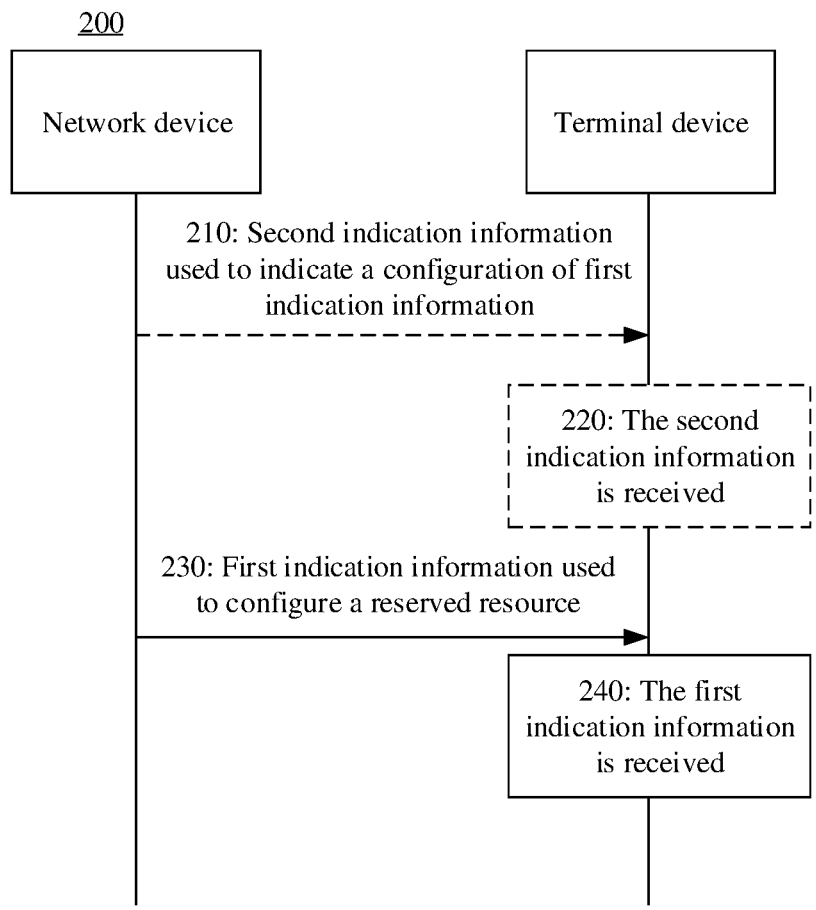
FIG. 2 is a schematic flowchart of a method for transmitting information according to an embodiment of the disclosure.

FIG. 2 is a schematic flowchart of a method 200 for transmitting information according to an embodiment of the disclosure. As illustrated in FIG. 2, the method 200 includes the following operations.

It is to be understood that in the method 200 illustrated in FIGS. 2, 210 and 220 are optional operations, and a configuration of second indication information may be preconfigured in 230 and 240.

In 210, a network device sends second indication information, here, the second indication information is used to configure first indication information.

Optionally, the network device sends the second indication information to a terminal device.

Optionally, the network device may send the second indication information in a broadcast or dedicated signaling manner.

In 220, a terminal device receives the second indication information.

Optionally, the terminal device receives the second indication information sent by the network device.

Optionally, the terminal device receives the second indication information, which is forwarded by another terminal device, from the network device.

Optionally, the second indication information may include configuration information of the first indication information.

Optionally, the configuration information of the first indication information includes at least one piece of information of: a period for sending the first indication information, a sending pattern of the first indication information, or a resource occupied by the first indication information. Optionally, different information may be carried in different fields in the second indication information.

Herein, the period for sending the first indication information may be used to indicate a time interval at which the first indication information is sent, and the interval may take a frame, a sub-frame, a slot or a symbol as a unit.

Herein, the sending pattern of the first indication information may be used to indicate at least one of: a time interval at which the first indication information is sent, a carrier spacing at which the first indication information is sent, or a resource occupied for sending the first indication information or the like.

Herein, the resource occupied by the first indication information may be at least one of: a time domain resource required to be occupied by the first indication information, a frequency domain resource required to be occupied by the first indication information, a space domain resource required to be occupied by the first indication information, or a code domain resource required to be occupied by the first indication information.

Optionally, the second indication information is carried through a system message or a dedicated message.

Herein, when the second indication information is sent through the system message, the second indication information may be sent in a broadcast manner. The terminal device, responsive to detection of the system message by the terminal device, may determine configuration information of the first indication information and acquire the first indication information according to the configuration information.

Optionally, the dedicated message is RRC layer dedicated signaling, MAC Control Element (CE) signaling, or physical layer control signaling.

Herein, when the second indication information is sent through the dedicated message, the second indication information may be specific to a specific terminal. The specific terminal receives the second indication information and may acquire the first indication information according to the second indication information.

Optionally, the network device may send the second indication information according to a requirement of the terminal device. For example, the network device, according to a service of the terminal device, determines a frequency at which a reserved resource is required to be configured, so that the network device sends the second indication information according to the frequency at which the reserved resource is configured.

In 230, the network device sends the first indication information according to a configuration of the first indication information, here, the first indication information is used to configure a reserved resource.

Optionally, the network device may send the first indication information to the terminal device.

Optionally, the network device may send the first indication information to the terminal device in a broadcast or dedicated signaling manner.

In 240, the terminal device receives the first indication information according to the configuration of the first indication information.

Optionally, the terminal device receives the first indication information sent by the network device.

Optionally, the terminal device receives the first indication information, which is forwarded by the other terminal device, from the network device.

Optionally, the first indication information is used to indicate configuration information of the reserved resource allocated for the terminal device.

Optionally, the first indication information may further modify a previous reserved resource that has been configured. Herein, the previous reserved resource that has been configured may be configured through RRC signaling.

For example, the network device modifies a corresponding configuration of the reserved resource through a physical layer control signaling, for example, a duration is modified from one symbol to multiple symbols, that is, all reserved resource configurations through high layer control signaling are covered by the physical layer control signaling.

Optionally, the configuration information of the reserved resource includes at least one piece of information of: a period of the reserved resource, a size of the reserved resource, a pattern of the reserved resource, a time domain resource occupied by the reserved resource, a frequency domain resource occupied by the reserved resource, a code domain resource occupied by the reserved resource, or a space domain resource occupied by the reserved resource.

Optionally, different information is carried in different fields in the first indication information.

Optionally, the reserved resource may be continuous or discontinuous in time or frequency.

Optionally, the first indication information belongs to a first message, and the first message carries an indication field. Herein, when a value of the indication field is a first value, it is indicated that the first message is used to carry the first indication information. Herein, when the value of the indication field is a second value, it is indicated that the first message is used to carry an uplink or downlink grant.

For example, the physical layer control signaling may be used to carry the uplink or downlink grant, and may also be used to carry the configuration information of the reserved resource. The physical-layer control signaling may include an indication field, the indication field may be a reserved field, and different values are carried in the indication field to distinguish whether the physical layer control signaling is used to carry the configuration information of the reserved resource or used to carry the uplink or downlink grant. For example, when a value of the indication field is 1, it is indicated that the physical layer control signaling is used to carry the configuration information of the reserved resource, and when the value of the indication field is 0, it is indicated that the physical layer control signaling is used to carry the uplink or downlink grant.

Optionally, in addition to carrying the configuration information of the reserved resource, the first indication information carries the uplink or downlink grant, and the uplink or downlink grant is able to index a service for which the reserved resource is used. The terminal device may receive or send data in the service on the reserved resource.

Optionally, the uplink or downlink grant may include an index of the service or a logical channel identifier of the service.

Optionally, the first indication information is carried through a system message or a dedicated message.

Herein, when the first indication information is sent through the system message, the first indication information may be sent in a broadcast manner. The terminal device, responsive to detection of the system message by the terminal device, may determine the configuration information of the reserved resource and determine the reserved resource according to the configuration information.

Optionally, the dedicated message is RRC layer dedicated signaling, MAC CE signaling or physical layer control signaling.

Herein, when the first indication information is sent through the dedicated message, the first indication information may be for a specific terminal. The specific terminal receives the first indication information and may determine the reserved resource according to the first indication information.

Optionally, the network device may, according to a requirement of the terminal device (for example, a service of the terminal device), determine a reserved resource required to be configured, and thus send the first indication information according to the reserved resource required to be configured.

Optionally, the terminal device receives or sends the data on the reserved resource according to the configuration information of the reserved resource.

For example, the reserved resource may be a reserved subframe, and the terminal device may transmit data of an enhanced Multimedia Broadcast Multicast Service (eM-BMS) on the reserved subframe.

For example, the reserved resource is a reserved subframe, a certain cell may vacate the reserved subframe and perform corresponding data transmission with a co-frequency neighbor cell on the vacated reserved subframe, and in such case, the reserved subframe may be called an Almost Blank Subframe (ABS).

For convenient understanding, a sending manner for the configuration information of the physical layer control signaling and for the configuration information of the reserved resource will be described in combination with FIGS. 3a, 3b, 4a and 4b with the condition that the first indication information is carried through the physical layer control signaling as an example. Herein, the black filled part is a time-frequency resource occupied by the physical layer control signaling, and the white filled part is a time-frequency resource occupied by the reserved resource indicated by the physical layer control signaling.

Figure 3A:
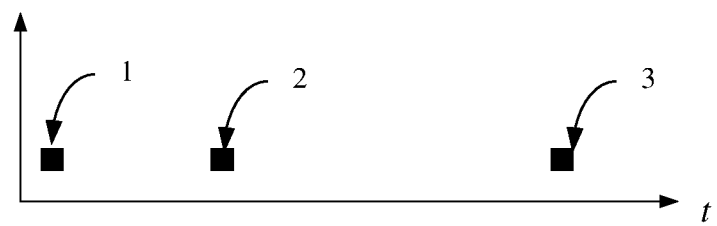
FIGS. 3a-3b are schematic diagrams of resources that are occupied by first indication information and a reserved resource according to an embodiment of the disclosure.
Figure 3B:
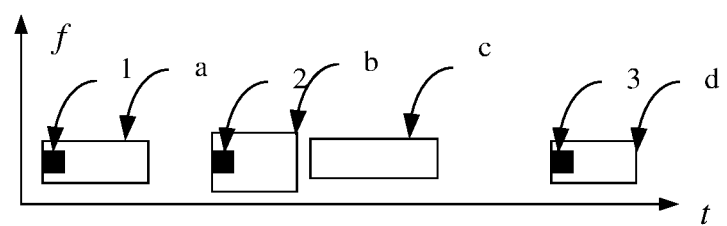

For example, as illustrated in FIG. 3a, the network device may configure the time-frequency resource occupied by the physical layer control signaling. As illustrated in FIG. 3a, the time-frequency resource required to be occupied by the physical layer control signaling includes a time-frequency resource 1, a time-frequency resource 2 and a time-frequency resource 3. The network device may send the physical layer control signaling on the time-frequency resource occupied by the physical layer control signaling illustrated in FIG. 3a, and the physical layer control signaling may be used to configure a reserved resource reserved for the terminal device. As illustrated in FIG. 3b, physical control signaling sent on the time-frequency resource 1 may indicate configuration information of a reserved resource a, physical layer control signaling sent on the time-frequency resource 2 may indicate configuration information of reserved resources b and c, and physical layer control signaling sent on the time-frequency resource 3 may indicate configuration information of a reserved resource d.

Figure 4A:
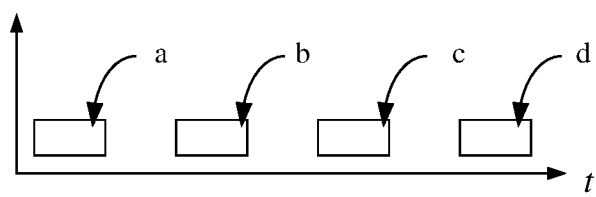
FIGS. 4a-4b are schematic diagrams of resources that are occupied by first indication information and a reserved resource according to an embodiment of the disclosure.
Figure 4B:
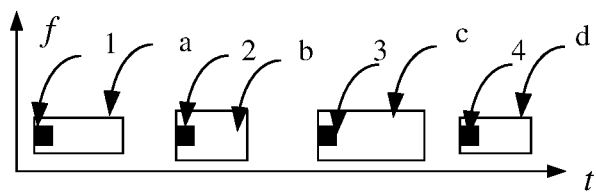

For example, the reserved resource illustrated in FIG. 4a may be a previous reserved resource that has been configured, and for example, may be a reserved resource configured by the network device through RRC control signaling, and the reserved resource may include a reserved resource a, a reserved resource b, a reserved resource c and a reserved resource d. The network device may modify the reserved resource. For example, the network device may send the configuration information of the physical layer control signaling. For example, as illustrated in FIG. 4b, the reserved resource c is required to be modified, and for example, the number of symbols occupied by the reserved resource c is modified. Configuration information of the time-frequency resource 3 occupied by the physical layer control signaling may be sent, and the physical layer control signaling is sent on the time-frequency resource 3 to modify the number of the symbols occupied by the reserved resource c. Optionally, the network device may further send configuration information of the time-frequency resource 1, the time-frequency resource 2 and the time-frequency resource 4 to indicate that the reserved resource a, the reserved resource b and the reserved resource c are not required to be modified. Herein, the configuration information of the time-frequency resource 3 (optionally, including the time-frequency resource 1, the time-frequency resource 2 and the time-frequency resource 4) may be sent through the same signaling.

Accordingly, in the embodiment of the disclosure, the network device sends to the terminal device the second indication information used to indicate the configuration information of the first indication information, and sends, according to the configuration information of the first indication information, to the terminal device, the first indication information used to indicate the configuration information of the reserved resource allocated for the terminal device. Thus, the terminal device may acquire the configuration information of the first indication information according to the second indication information and acquire the configuration information of the reserved resource according to the configuration information of the first indication information. Therefore, the reserved resource may be flexibly allocated, and efficiency of the reserved resource may be improved.

Optionally, a configuration of the first indication information may also be preconfigured, so that the reserved resource may also be flexibly allocated, and the efficiency of the reserved resource may be improved.

In addition, the embodiment of the disclosure may be applied to an NR system, and the reserved resource may achieve forward compatibility.

Moreover, the first indication information may further be used to modify a previous reserved resource that has been allocated, so that flexibility of the reserved resource may further be improved.

Figure 5:
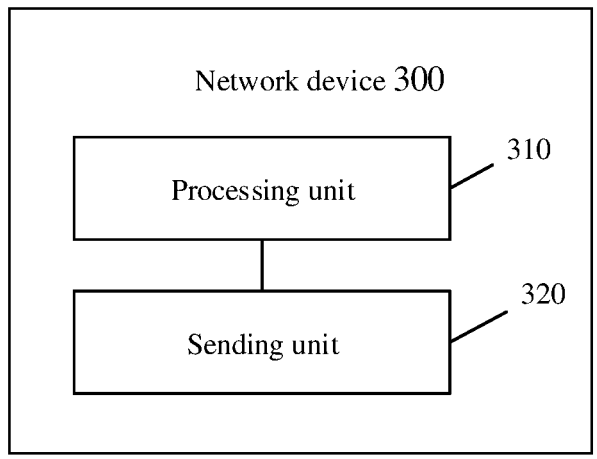
FIG. 5 is a schematic block diagram of a network device according to an embodiment of the disclosure.

FIG. 5 is a schematic block diagram of a network device 300 according to an embodiment of the disclosure. As illustrated in FIG. 5, the network device 300 includes a processing unit 310 and a sending unit 320.

The processing unit 310 is configured to generate first indication information, here, the first indication information is used to indicate a reserved resource.

The sending unit 320 is configured to send the first indication information, here, the first indication information is sent according to a configuration of the first indication information.

Optionally, the processing unit 310 is further configured to generate second indication information, here, the second indication information is used to configure the first indication information.

The sending unit 320 is further configured to send the second indication information.

Optionally, the first indication information is used to modify a previous reserved resource that has been configured.

Optionally, the second indication information is used to indicate at least one of: a period for sending the first indication information, a sending pattern of the first indication information, or a resource occupied by the first indication information.

Optionally, the first indication information is used to indicate at least one piece of information of: a period of the reserved resource, a size of the reserved resource, a pattern of the reserved resource, a time domain resource occupied by the reserved resource, a frequency domain resource occupied by the reserved resource, a code domain resource occupied by the reserved resource, or a space domain resource occupied by the reserved resource.

Optionally, different information is carried in different fields in the first indication information.

Optionally, the first indication information carries an uplink or downlink grant that is able to index a service for which the reserved resource is used.

Optionally, the uplink or downlink grant includes an index of the service or a logical channel identifier of the service.

Optionally, the first indication information is carried through a system message or a dedicated message.

Optionally, the second indication information is carried through a system message or a dedicated message.

Optionally, the dedicated message is RRC layer dedicated signaling, MAC layer control signaling, or physical layer control signaling.

It is to be understood that the network device may correspond to the network device in the method 200, and may implement corresponding operations of the network device in the method 200 and, for simplicity, will not be elaborated herein.

Figure 6:
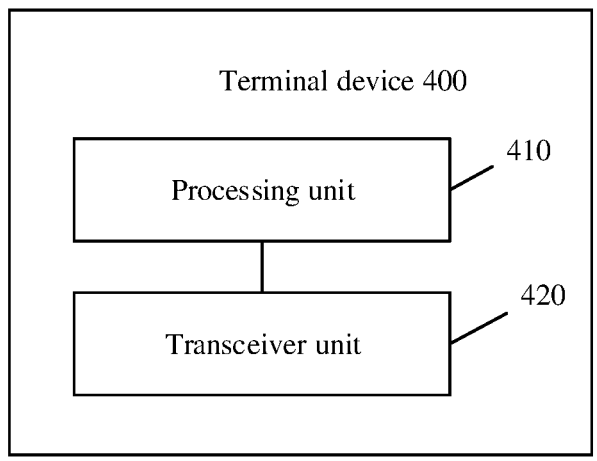
FIG. 6 is a schematic block diagram of a terminal device according to an embodiment of the disclosure.

FIG. 6 is a schematic block diagram of a terminal device 400 according to an embodiment of the disclosure. As illustrated in FIG. 6, the terminal device 400 includes a processing unit 410 and a transceiver unit 420.

The processing unit 410 is configured to acquire a configuration of first indication information.

The transceiver unit 420 is configured to receive the first indication information, here, the first indication information is used to indicate a reserved resource and is received according to the configuration of the first indication information.

Optionally, the transceiver unit 420 is further configured to receive second indication information, here, the second indication information is used to configure the first indication information.

Optionally, the first indication information is used to modify a previous reserved resource that has been configured.

Optionally, the transceiver unit 420 is further configured to receive or send data on the reserved resource.

Optionally, the first indication information carries an uplink or downlink grant that is able to index a service for which the reserved resource is used.

The transceiver unit 420 is further configured to receive or send data in the service on the reserved resource.

Optionally, the uplink or downlink grant includes an index of the service or a logical channel identifier of the service.

Optionally, the second indication information is used to indicate at least one of: a period for sending the first indication information, a sending pattern of the first indication information, or a resource occupied by the first indication information.

Optionally, the first indication information is used to indicate at least one piece of information of: a period of the reserved resource, a size of the reserved resource, a pattern of the reserved resource, a time domain resource occupied by the reserved resource, a frequency domain resource occupied by the reserved resource, a code domain resource occupied by the reserved resource, or a space domain resource occupied by the reserved resource.

Optionally, different information is carried in different fields in the first indication information.

Optionally, the first indication information is carried through a system message or a dedicated message.

Optionally, the second indication information is carried through a system message or a dedicated message.

Optionally, the dedicated message is RRC layer dedicated signaling, MAC layer control signaling, or physical layer control signaling.

It is to be understood that the terminal device 400 may correspond to the terminal device in the method 200, and may implement corresponding operations implemented by the terminal device in the method 200 and, for simplicity, will not be elaborated herein.

Figure 7:
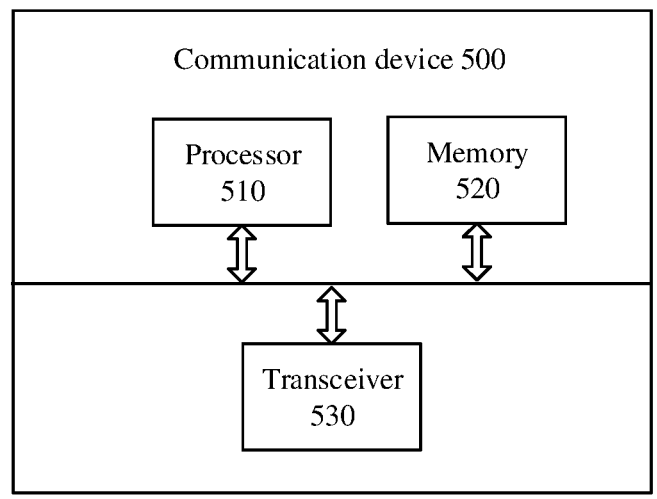
FIG. 7 is a schematic block diagram of a communication device according to an embodiment of the disclosure.

FIG. 7 is a schematic block diagram of a communication device 500 according to an embodiment of the disclosure. As illustrated in FIG. 7, the device 500 includes a processor 510 and a memory 520. Herein, the memory 520 may store a program code, and the processor 510 may execute the program code stored in the memory 520.

Optionally, as illustrated in FIG. 7, the device 500 may include a transceiver 530, and the processor 510 may control the transceiver 530 for external communication.

Optionally, the processor 510 may call the program code stored in the memory 520 to execute corresponding operations of the terminal device in the method 200 illustrated in FIG. 2. For similarity, no more elaborations will be made herein.

Optionally, the processor 510 may call the program code stored in the memory 520 to execute corresponding operations of the network device in the method 200 illustrated in FIG. 3. For similarity, no more elaborations will be made herein.

Figure 8:
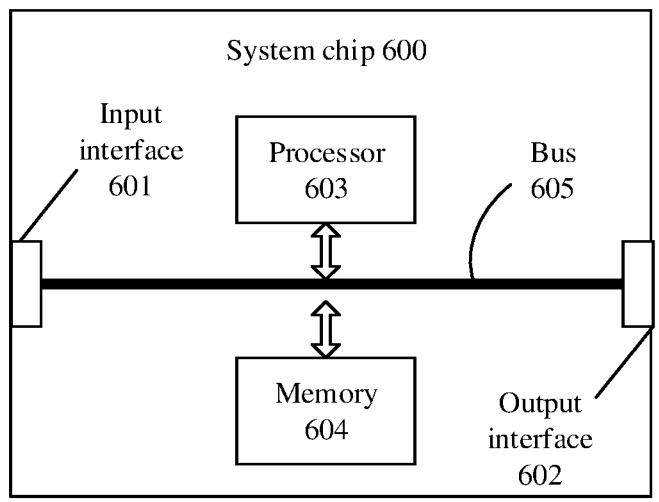
FIG. 8 is a schematic block diagram of a system chip according to an embodiment of the disclosure.

FIG. 8 is a schematic structure diagram of a system chip according to an embodiment of the disclosure. The system chip 600 of FIG. 8 includes an input interface 601, output interface 602, processor 603 and memory 604 which are connected through communication connections. The processor 603 is configured to execute a code in the memory 604.

Optionally, when the code is executed, the processor 603 implements the method executed by the terminal device in the method embodiment. For simplicity, no more elaborations will be made herein.

Optionally, when the code is executed, the processor 603 implements the method executed by the network device in the method embodiment. For simplicity, no more elaborations will be made herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the related art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes, such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting information, comprising:
    sending, by a network device, first indication information, the first indication information being used to indicate a reserved resource and being sent according to a configuration of the first indication information, wherein the first indication information belongs to a first message, the first message carries an indication field, the indication field indicates that the first message is used to carry the first indication information when a value of the indication field is a first value, the indication field indicates that the first message is used to carry an uplink or downlink grant when the value of the indication field is a second value.

2. The method of claim 1, further comprising: before sending, by the network device, the first indication information,
    sending, by the network device, second indication information, the second indication information being used to configure the first indication information.

3. The method of claim 2, wherein the second indication information is used to indicate at least one of: a period for sending the first indication information, a sending pattern of the first indication information, or a resource occupied by the first indication information.

4. The method of claim 2, wherein the second indication information is carried through a system message or a dedicated message.

5. The method of claim 1, wherein the first indication information is used to modify a previous reserved resource that has been configured.

6. The method of claim 1, wherein the first indication information is used to indicate at least one piece of information of: a period of the reserved resource, a size of the reserved resource, a pattern of the reserved resource, a time domain resource occupied by the reserved resource, a frequency domain resource occupied by the reserved resource, a code domain resource occupied by the reserved resource, or a space domain resource occupied by the reserved resource.

7. The method of claim 6, wherein different information is carried in different fields in the first indication information.

8. The method of claim 1, wherein the first message carries the uplink or downlink grant that is able to index a service for which the reserved resource is used.

9. The method of claim 8, wherein the uplink or downlink grant comprises an index of the service or a logical channel identifier of the service.

10. The method of claim 1, wherein the first indication information is carried through a system message or a dedicated message.

11. A network device, comprising a processor and a transceiver coupled with the processor, wherein
the processor is configured to send, through the transceiver, a first indication information, the first indication information being used to indicate a reserved resource; and the first indication information being sent according to a configuration of the first indication information, wherein the first indication information belongs to a first message, the first message carries an indication field, the indication field indicates that the first message is used to carry the first indication information when a value of the indication field is a first value, the indication field indicates that the first message is used to carry an uplink or downlink grant when the value of the indication field is a second value.

12. The network device of claim 11, wherein
the processor is further configured to send, through the transceiver, second indication information, the second indication information being used to configure the first indication information.

13. The network device of claim 12, wherein the second indication information is used to indicate at least one of: a period for sending the first indication information, a sending pattern of the first indication information, or a resource occupied by the first indication information.

14. The network device of claim 11, wherein the first indication information is used to modify a previous reserved resource that has been configured.

15. The network device of claim 11, wherein the first indication information is used to indicate at least one piece of information of: a period of the reserved resource, a size of the reserved resource, a pattern of the reserved resource, a time domain resource occupied by the reserved resource, a frequency domain resource occupied by the reserved resource, a code domain resource occupied by the reserved resource, or a space domain resource occupied by the reserved resource.

16. The network device of claim 15, wherein different information is carried in different fields in the first indication information.

17. The network device of claim 11, wherein the first message carries the uplink or downlink grant that is able to index a service for which the reserved resource is used.

18. The network device of claim 17, wherein the uplink or downlink grant comprises an index of the service or a logical channel identifier of the service.

19. The network device of claim 11, wherein the first indication information is carried through a system message or a dedicated message.

20. The network device of claim 19, wherein the dedicated message is Radio Resource Control (RRC) layer dedicated signaling, Media Access Control (MAC) layer control signaling, or physical layer control signaling.

* * * * *